United States Patent [19]

Grezzo Page et al.

[11] Patent Number: 5,713,993
[45] Date of Patent: Feb. 3, 1998

[54] PIGMENTED INK SET AND PROCESS FOR ALLEVIATING BLEED IN PRINTED ELEMENTS USING CARBOXYLIC ACID ADDITIVES

[75] Inventors: Loretta Ann Grezzo Page, Newark; Milan Bohuslav Bednarek, Wilmington, both of Del.; Zeying Ma, San Diego; Keshava Anand Prasad, San Marcos, both of Calif.

[73] Assignee: E.I. du Pont De Nemours and Company, Wilmington, Del.

[21] Appl. No.: 706,419

[22] Filed: Aug. 30, 1996

[51] Int. Cl.$^6$ .................................... C09D 11/02
[52] U.S. Cl. ................ 106/31.85; 106/31.86; 106/31.87
[58] Field of Search ............... 106/31.85, 31.86, 106/31.87

[56] References Cited

U.S. PATENT DOCUMENTS

| | | | |
|---|---|---|---|
| 5,091,005 | 2/1992 | Mueller et al. | 106/22 H |
| 5,116,409 | 5/1992 | Moffatt | 106/22 R |
| 5,181,045 | 1/1993 | Shields et al. | 346/1.1 |
| 5,231,131 | 7/1993 | Chu et al. | 524/504 |
| 5,518,534 | 5/1996 | Pearlstine et al. | 106/20 R |
| 5,519,085 | 5/1996 | Ma et al. | 106/31.86 |
| 5,531,816 | 7/1996 | Wickramanayake | 106/31.86 |
| 5,626,655 | 5/1997 | Pawlowski et al. | 106/31.59 |

FOREIGN PATENT DOCUMENTS 0 586 079 A1  3/1994  European Pat. Off.  ........ C09D 11/00

*Primary Examiner*—Helene Klemanski

[57] ABSTRACT

Bleed between two adjacent pigmented inks on a printing medium is reduced. The first ink has at least one neutralized carboxylic acid group, neutralized amine, or a quaternized amine group; and the second ink contains a polymeric dispersant having at least one sulfonate or phosphonate group, and a carboxylic acid additive having a pKa of up to 3.5.

29 Claims, No Drawings

PIGMENTED INK SET AND PROCESS FOR ALLEVIATING BLEED IN PRINTED ELEMENTS USING CARBOXYLIC ACID ADDITIVES

FIELD OF THE INVENTION

This invention relates to a method of making printed elements. More particularly, this invention relates to a method of making printed elements having reduced color bleed.

BACKGROUND OF THE INVENTION

There are many methods of making printed elements whereby printing liquids are applied to a substrate to form an image. The term "printing liquid", as it is commonly understood in the art, means a colorant in a liquid media. Examples are paints, liquid toners, and inks. The liquid media may be an organic solvent ("solvent based") or water ("aqueous based"). The colorant may be a dye or a pigment. Other ingredients typically are present, depending upon the particular printing technique being employed.

Exemplary methods of using printing liquids include gravure and press printing, xerographic techniques using liquid toners, and ink jet printing, to name but a few. Of these methods, ink jet printing has become increasingly popular, particularly for so-called "desk-top publishing" applications, because of its ability to make multi-color prints by introducing three or four primary inks on a substrate in a single pass. Other printing methods generally require at least one pass through the printer for each primary color.

A problem arises in most printing techniques when a printing liquid of one color is placed in abutting relationship to a printing liquid of another color. This problem is manifested in a mixing ("bleeding") of the two printing liquids at their interface, whereby the line of demarcation between the two printing liquids is obscured. Bleeding may cause undesired color formation at the interface with a concurrent loss of resolution, color separation, edge acuity and color purity. The more contrasting the two adjacent liquids are in color (such as black and yellow), the more visual the bleed. Bleed is also particularly noticeable when the mixing produces a secondary color, such as when blue and yellow mix to produce green. Bleed is a particular problem in ink jet printing because the relatively low viscosity inks tend to spread and because ink jet printers have the capability of printing three or four primary colors in simultaneous (or near simultaneous) fashion.

Several methods have been proposed to prevent bleed. The most obvious method is to apply the two printing liquids at a distance from one another such that no intermingling or mixing of the printing liquids can occur. This method, however, produces images having poor resolution.

A commonly used method delays application of the second printing liquid until the first printing liquid is completely dry. This method not only is inefficient, but also is not particularly effective. For example, bleed may occur even if the first printing liquid is dry, which may be caused by the colorants of the first printing liquid becoming "redissolved" in the liquid medium of the second printing liquid. Thus, the more soluble the components of the first printing liquid in the liquid medium, the more likely bleed will occur. This method is particularly disadvantageous in ink jet printing because it introduces delays when generating multi-colored prints.

U.S. Pat. No. 5,091,005 teaches that the addition of formamide to inks will reduce the occurrence of bleed in some circumstances. Yet another approach to bleed control is to increase the penetration rate into the substrate, which has its own shortcomings. First, it is inherently limited to printing applications using particular printing liquid/substrate combinations. For example, highly absorbant substrates may be required. Second, bleed will still be apparent unless the first colorant becomes bound to the substrate to the extent that it will not be dissolved by the liquid medium of the second printing liquid. Third, known ways of increasing penetration have a tendency to degrade text quality.

A combination of the above approaches is disclosed in U.S. Pat. No. 5,116,409, which discloses use of zwitterionic surfactants or non-ionic amphiphiles in concentrations above their respective critical micelle concentration. The formation of micelles containing dye molecules is said to prevent the dye molecules in each ink from mixing.

U.S. Pat. No. 5,181,045 teaches a method of ink jet printing wherein one of inks contains a dye that becomes insoluble under defined pH conditions and the other ink has a pH that renders the dye contained in the first ink insoluble. This method is inherently limited, however, to a specific group of dyes as colorants. In addition, the ink formulations are also constrained by the need for pH buffers which further limits the utility of that method.

EP 0586 079 A1 discloses a method for preventing color bleed between two different color ink compositions wherein the first ink is anionic and has a coloring agent having one or more carboxyl and/or carboxylate groups, and the second ink includes a precipitating agent designed to ionically crosslink with the coloring agent in the first ink to form a solid precipitate that prevents bleed between the two ink compositions. Multivalent metal salts are disclosed as being useful as the precipitating agent. Although this approach provides effective bleed control for two inks, addition of salts may cause ink flocculation and nozzle pluggage.

Dyes are a common colorant used in ink jet printing because they are readily water soluble and provide vibrant chromatic colors on plain paper. Unfortunately, however, many dyes possess poor resistance to light, water, and handling on paper. Consequently, dye colorants have deficiencies for archiving print samples. Pigment colorants have been used as an alternative for dyes since they generally possess excellent light and water fastness. However, most pigments do not achieve the same color intensity (i.e., "chroma") on plain paper as dyes.

One approach to improve pigment chroma is to employ a vehicle that holds the colorant on the paper surface rather than allowing the pigment to diffuse into the paper. Such vehicles tend not to penetrate into the paper, however, and are not adapted for quick drying or bleed control. Another approach to improving pigment chroma is to use a specially coated media which helps keep the colorant on the surface of the paper. However, such media typically is more expensive than paper. Furthermore, one is restricted to printing only with the special media.

Accordingly, there is a need for an improved method for printing multi-colored images that does not present the bleed problem discussed above. Moreover, there is a particular need for a method that achieves the excellent resistance to water and light obtainable with pigment colorants, with improved chroma.

SUMMARY OF THE INVENTION

It now has been found that bleed between two adjacent pigmented inks may be reduced when the first ink contains a polymeric dispersant having at least one neutralized carboxylic acid or amine group, or quaternized amine group, and the second ink contains (1) a polymeric dispersant having a sulfonate or phosphonate group and (2) a carboxylic acid additive having a pKa of up to 3.5. Accordingly, in one embodiment the present invention provides a set of printing liquids for alleviating bleed in multicolor printed elements comprising:

(a) a first pigmented printing liquid comprising:
  (i) an aqueous carrier medium,
  (ii) a pigment, and
  (iii) a polymeric dispersant having at least one group selected from the group consisting of a neutralized carboxylic acid group, a neutralized amine group and a quaternized amine group; and
(b) a second pigmented printing liquid comprising:
  (i) an aqueous carrier medium,
  (ii) a pigment,
  (iii) a polymeric dispersant having at least one sulfonate or phosphonate group, and
  (iv) a carboxylic acid additive having a pKa of up to 3.5.

In a preferred embodiment, the printing liquids are inks adapted for use in an ink jet printer.

In another embodiment, the invention provides a process for creating a multicolor printed element having reduced color bleed comprising:

(a) providing a first pigmented printing liquid comprising:
  (i) an aqueous carrier medium,
  (ii) a pigment, and
  (iii) a polymeric dispersant having at least one group selected from the group consisting of a neutralized carboxylic acid group, a neutralized amine group and a quaternized amine group;
(b) providing a second printing liquid comprising:
  (i) an aqueous carrier medium,
  (ii) a pigment, and
  (iii) a polymeric dispersant having at least one sulfonate or phosphonate group, and
  (iv) a carboxylic acid additive having a pKa of up to 3.5; and
(c) applying the first ink and the second ink to a substrate in contact with each other.

While the invention may be used in a variety of applications, such as air brush printing, it is particularly well adapted for use in ink jet printing, most specifically in thermal ink jet printing applications. While the inks typically will be applied in abutting relationship on the medium, the inks also may be applied in an overlay relationship.

DETAILED DESCRIPTION OF THE PREFERRED EMBODIMENTS

The invention now will be described in detail with particular reference to aqueous ink jet ink compositions. The invention, however, has application with other printing liquids such as paints and liquid toners, and in other printing techniques.

Aqueous inks suitable for use in this invention have an aqueous carrier medium, a pigment colorant, and a polymeric dispersant. The polymeric dispersant for the first ink has at least one group selected from the group consisting of a neutralized carboxylic acid group, a neutralized amine group, and a quaternized amine group. The second ink contains (1) a polymeric dispersant having at least one sulfonate or phosphonate group and (2) a carboxylic acid additive having a pKa up to 3.5. The advantages of improved color in the printed element are observed in such combinations, wherein the inks are in overlay relationship to one another, or wherein the inks abut each other on the printing substrate. The resulting printed images are of high quality in that individual dots are round with sharp edges, and there is little feathering or strike through.

INK COMPOSITION

As mentioned above, the first ink comprises an aqueous carrier medium, a pigment and a polymeric dispersant having at least one group selected from the group consisting of a neutralized carboxylic acid group, a neutralized amine group, or a quaternized amine group, and the second ink contains (1) a polymeric dispersant having at least one sulfonate or phosphonate group and (2) a carboxylic acid additive having a pKa of up to 3.5, preferably up to 2.5. The inks also may contain other additives as mentioned below or as known in the art of ink jet printing.

AQUEOUS CARRIER MEDIUM

The aqueous carrier medium is water or a mixture of water and at least one water soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is preferred as the aqueous carrier medium.

In the case of a mixture of water and a water-soluble solvent, the aqueous carrier medium usually contains from about 30% to about 95% water with the balance (i.e., 70 to 5%) being the water-soluble solvent. The preferred compositions are approximately 60% to about 95% water, based on the total weight of the aqueous carrier medium.

The amount of aqueous carrier medium in the ink is in the range of approximately 70 to 99.8%, preferably 94 to 99.8%, based on total weight of the ink when an organic pigment is selected; and approximately 25 to 99.8%, preferably 70 to 99.8% when an inorganic pigment is selected.

PIGMENT

As used herein, the term "pigment" means a colorant that is insoluble in the aqueous carrier medium, and includes disperse dyes.

Pigments

Useful pigments comprise a wide variety of organic and inorganic pigments, alone or in combination. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 micron. Preferably, the pigment particle size should range from 0.005 to 5 micron and most preferably, from 0.01 to 0.3 micron.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry and presscake pigments that may be used in practicing the invention are disclosed in the aforementioned U.S. Pat. No. 5,085,698.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

In the case of organic pigments, the ink may contain up to approximately 30% pigment by weight, but will generally be in the range of approximately 0.1 to 15%, preferably approximately 0.1 to 8%, by weight of the total ink composition for most thermal ink jet printing applications. If an inorganic pigment is selected, the ink will tend to contain higher weight percentages of pigment than with comparable inks employing organic pigment, and may be as high as approximately 75% in some cases, because inorganic pigments generally have higher specific gravities than organic pigments.

Disperse Dyes

The color and amount of disperse dye used in the ink is largely a function of choice, being primarily dependent upon the desired color of the print achieved with the ink, the purity of the dye, and its strength. Low concentrations of dye may not give adequate color vividness. High concentrations may result in poor printhead performance or unacceptably dark colors. The disperse dye may be present in the amount of 0.01 to 20%, by weight, preferably 0.05 to 8%, by weight, more preferably 1 to 5%, by weight, based on the total weight of the ink. Representative disperse dyes that may be useful in this invention are disclosed in U.S. Pat. No. 5,053,495; U.S. Pat. No. 5,203,912; and U.S. Pat. No. 5,102,448.

POLYMERIC DISPERSANT

The first ink contains a polymeric dispersant having at least one group selected from the group consisting of a neutralized carboxylic acid group, a neutralized amine group, or quaternized amine group; and the second ink contains a polymeric dispersant having at least one sulfonate or phosphonate group. The first ink may be cationic or anionic. The second ink is anionic.

Polymers particularly useful as polymeric dispersants include AB, BAB, or ABC block copolymers, or $A_x(BA)_yB_z$ graft copolymers, wherein x=0 to 10,000, y=2 to 10,000 and z=0 to 10,000. In AB or BAB block copolymers, the A segment is a hydrophobic homopolymer or copolymer which serves to link with the pigment and the B block is a hydrophilic homopolymer or copolymer, or salt thereof, which serves to disperse the pigment in the aqueous medium. Such polymeric dispersants having a carboxylic acid group and amine containing block copolymers and the synthesis thereof are disclosed in Ma et al., U.S. Pat. No. 5,085,698. ABC triblocks are also useful as pigment dispersants. In the ABC triblock, the A block is a polymer compatible with water, the B block is a polymer capable of binding to the pigment and the C block is compatible with the organic solvent. The A and C blocks are end blocks. ABC triblocks and their synthesis are disclosed in Ma et al., European Patent Application 0 556 649 A1 published Aug. 28, 1993. In $A_x(BA)_yB_z$ graft copolymers, the A segments are hydrophobic homopolymers or copolymers which serve to link the pigment in the aqueous medium. Synthesis of graft structured copolymers has been disclosed in Mancinelli, U.S. Pat. No. 5,006,582. Although random copolymers can be used as dispersing agents, they are not as effective in stabilizing pigment dispersions as the block polymers.

Some examples of hydrophobic monomers used in polymeric dispersants are methyl methacrylate, n-butyl methacrylate, 2-ethylhexyl methacrylate, benzyl methacrylate, 2-phenylethyl methacrylate and the corresponding acrylates. Some examples of hydrophilic monomers containing neutralized carboxylic acid, neutralized amine or quaternized amine groups useful in preparing dispersants for the first ink are methacrylic acid, acrylic acid, dimethylaminoethyl [meth]acrylate and salts thereof. Also quaternary salts of dimethylaminoethyl [meth]acrylate may be employed. Some examples of hydrophilic monomers containing sulfonate or phosphonate groups useful in preparing the dispersants for the second ink are 2-aminomethylpropane sulfonic acid (AMPS), styrene sulfonic acid, styrene sulfonate, sulfopropyl acrylate, sulfopropyl [meth]acrylate, and vinyl phosphonic acid.

The carboxylic acid group containing polymeric dispersants in the first ink may be neutralized as disclosed in Ma et al., U.S. Pat. No. 5,085,698. Preferably, the polymeric dispersant in the first ink is neutralized with dimethylethanolamine, sodium hyroxide or potassium hydroxide. Alternately, the polymeric dispersants selected for the first ink may quaternized with benzyl chloride, methyl iodide, methyl sulfate, dimethyl sulfate, etc. Preferably, the neutralized or quaternized amines in the first ink are tertiary amines.

The sulfonic acid or phosphonic acid groups in the second ink dispersant may be neutralized with organic bases such as mono-, di- and trimethylamine, morpholine, n-methyl morpholine; aminomethyl propanol; alcohol amines such as dimethylethanolamine (DMEA), methyldiethanolamine, mono-, di- and trimethanolamine; pyridine; ammonium hydroxide; tetraalkylammonium salts such as tetramethylammonium hydroxide, tetraethylammonium hydroxide; alkali metals such as lithium, sodium, potassium and the like. Preferred neutralizing agents include dimethylethanolamine, diethylethanolamine, aminomethyl propanol, potassium hydroxide and sodium hydroxide.

CARBOXYLIC ACID ADDITIVE

The carboxylic acid additive is present in the ink containing the dispersant having sulfonate or phosphonate group. The acid additive may have a pKa of up to 3.5, preferably up to 2.5. Preferably, the acid additive has a solubility in water of at least 4.5 parts in a 100 parts of water at 25° C. Some suitable carboxylic acid additives are oxalic acid, citric acid, glycolic acid, bromoacetic acid, chloroacetic acid, chloropropionic acid, maleic acid, malonic acid, phthalic acid and tartaric acid. The acid additive may be present in the amount of 0.2 to 30%, preferably 0.5 to 5%, based on the total weight of the ink components.

OTHER INGREDIENTS

Various types of additives may be used to modify the properties of the ink composition for particular applications. Anionic, nonionic, or amphoteric surfactants may be used in addition to the polymeric dispersants. A detailed list of non-polymeric as well as some polymeric surfactants are listed at pages 110–129, of 1990 McCutcheon's Functional Materials, North American Edition, Manufacturing Confection Publishing Co., Glen Rock, N.J. The choice of a specific surfactant is highly dependent on the particular ink composition and type of media substrate to be printed. One skilled in the art can select the appropriate surfactant for the specific substrate to be used in the particular ink composition. In aqueous inks, the surfactants may be present in the amount of 0.01–5% and preferably 0.2–2%, based on the total weight of the ink.

Cosolvents may be included to improve penetration and pluggage inhibition properties of the ink composition, and in fact are preferred. Such cosolvents are well known in the art. Representative cosolvents that can be used to advantage are exemplified in U.S. Pat. No. 5,272,201. Biocides may be used to inhibit growth of microorganisms. Dowicides® (Dow Chemical, Midland, Mich.), Nuosept® (Huls America, Inc., Piscataway, N.J.), Omidines® (Olin Corp., Cheshire, Conn.). Nopcocides® (Henkel Corp., Ambler, Pa.), Troysans® (Troy Chemical Corp., Newark, N.J.) and sodium benzoate are examples of such biocides. Sequestering agents such as EDTA may also be included to eliminate deleterious effects of heavy metal impurities. Other additives, such as humectants, viscosity modifiers and other acrylic or non-acrylic polymers may also be added to improve various properties of the ink compositions as desired.

MULTIPLE COLORS

For printing applications requiring more than two colors, the present invention may be used in combination with other known means of flocculating, precipitating or fixing ink.

INK PROPERTIES

Jet velocity, separation length of the droplets, drop size and stream stability are greatly affected by the surface tension and the viscosity of the ink. Pigmented ink jet inks suitable for use with ink jet printing systems have a surface tension in the range of about 20 dyne/cm to about 70 dyne/cm and, more preferably, in the range 30 dyne/cm to about 70 dyne/cm at 20° C. Acceptable viscosities are no greater than 20 cP, and preferably in the range of about 1.0 cP to about 10.0 cP at 20° C. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. The inks have excellent storage stability for a long period and do not clog in an ink jet apparatus. Fixing of the ink on the image recording material, such as, paper, fabric, film, etc., can be carried out speedily and surely. The printed ink images have clear color tones, high density, excellent water resistance and light fastness. Further the ink does not corrode parts of the ink jet printing device it comes in contact with, and it is essentially odorless, and non-toxic.

SUBSTRATES

The substrate may be any of those used in generating printed elements. For ink jet ink applications, cellulose and non-cellulose type substrates may be used to advantage, with the cellulose type substrates, such as paper, being preferred. If sized, the degree of sizing for the substrate can be from 1 second to 1000 seconds as measured by the Hercules size test (HST), as described in TAPPI standards T530 PM-83. The substrate is chosen so its HST value is compatible with the volume and composition of the ink drop in the printer to be used. The preferred HST is in the range of 200 to 500 seconds, most preferably 350 to 400 seconds. Some useful papers include 100% bleached kraft composed of a blend of hard and soft wood, 100% wood free cotton vellum, and wood containing paper made translucent either by pulp beating or with additives. A preferred paper is Gilbert Bond paper (25% cotton) designated style 1057, manufactured by Mead Company, Dayton, Ohio. Other substrates include cardboard, transparent films such as polyethylene terephthalate, fabrics, etc.

This invention will now be further illustrated, but not limited, by the following examples.

EXAMPLES

Polymer Preparation 1

This shows the preparation of an anionic carboxylic acid containing polymer, ETEGMA//BZMA//MAA 4//15//12 triblock polymer:

A 2-liter flask was equipped with a mechanical stirrer, thermometer, N2 inlet, drying tube outlet, and addition funnels. Tetrahydrofuran THF 830 gm, was charged to the flask. The catalyst tetrabutyl ammonium m-chlorobenzoate, 2.3 ml of a 1.0M solution in acetonitrile, was then added. Initiator, 1,1-bis(trimethylsiloxy)-2-methyl-1-propene, 50.00 gm (0.216M) was injected. Feed I [trimethylsilyl methacrylate, 408.62 gm (2.57 M)] was started at 0.0 minutes and added over 30 minutes. One hundred minutes after Feed I was completed (over 99% of the monomers had reacted), Feed II [benzyl methacrylate BZMA, 568.97 gm (3.23 M)] was started and added over 30 minutes. Thirty minutes after Feed II was completed (over 99% of the monomers had reacted), Feed III [2-(ethyoxytriethylenglycol) methacrylate ETEGMA, 212.07 gm (0.862M)] was started and added over 10 minutes.

After stirring 10 hours, 124 gm of dry methanol were added to the above solution and distillation begun, 2-pyrrolidone replacing the solvents. This made a MAA//BZMA//ETEGMA triblock polymer.

The block polymer was neutralized using the following procedure: 791.1 g of the polymer solution were mixed with 99.3 g of potassium hydroxide solution (45.9% in deionized water) and 2608.8 of deioninized water until a homogeneous 10% polymer solution was obtained.

Polymer Preparation 2

This shows the preparation of a macromonomer BZMA/ETEGMA/MAA 70/20/10:

To a 5-liter flask equipped with a mechanical stirrer, thermometer, N2 inlet, and addition funnels was charged, 350.0 g of BzMA, 100.0 g of ETEGMA, 50.0 g of methacrylic acid MAA, 750.0 g of acetone and 0.08 g of SCT. The reaction mixture was heated to the reflux temperature (62° C.) and 20.0 g of VAZO® 52 and 0.04 g SCT dissolved in 200.0 g of acetone was fed over 240 min together with the monomer mixture of 350.0 g of BzMA, 100.0 g of ETEGMA and 50.0 g of MAA. The reaction was finished off by addition of 5.0 g of Vazo® 52 dissolved in 50.0 g of acetone and the reflux was maintained for additional 120 minutes. The reaction mixture had 50.84% solids.

Polymer Preparation 3

This shows the preparation of an anionic sulfonic-acid containing polymer, AMPS/MA//-g-BZMA/ETEGMA/MAA 25/50//-g-17.5/5/2.5 graft copolymer:

To a 5-liter flask equipped with a mechanical stirrer, thermometer, N2 inlet, and additional funnels was charged, 200.0 g AMPS, 275.0 g isopropanol, 137.5 g water, 400.0 g methyl acrylate, 287.5 g acetone, 400.0 g 2-pyrrolidone and 400.0 g macromonomer solution described in the Polymer Preparation 4. The content of the flask was heated to the reflux temperature (72° C.) and 7.5 g of Lupersol® 11 free radical initiator dissolved in 40.0 g of isopropanol and 40.0 g of acetone was added to start the polymerization reaction. The remaining amount of the monomer solution (1200.0 g) was fed into the reaction flask over 180 minutes together with another charge of the Lupersol® 11 initiator solution. The reaction was finished off by adding an extra 5.0 g of the Lupersol® 11 initiator dissolved in 25.0 g of isopropanol and 25.0 g of acetone. The reaction mixture was kept at the reflux temperature for additional 120 minutes. The resulting polymer solution with 33.46% solids and acid number of 124.2 was neutralized with a solution of KOH in water to 90% of stoichiometry. The volatile solvents were then stripped off (845.0 g) and replaced with the same amount of water, with a final polymer solids of 33.5%.

Polymer Preparation 4

This shows the preparation of an anionic carboxylic-acid containing polymer, BZMA//MAA 13//10 diblock polymer:

A 2-liter flask was equipped with a mechanical stirrer, thermometer, N2 inlet, drying tube outlet, and addition funnels. Tetrahydrofuran THF 592 gm was charged to the flask. The catalyst, tetrabutyl ammonium m-chlorobenzoate, 2.3 ml of a 1.0M solution in acetonitrile, was then added. Initiator, 1,1-bis(trimethylsiloxy)-2-methyl-1-propene, 50.00 gm (0.216M) was injected. Feed I [trimethylsilyl methacrylate, 340.52 gm (2.16M)] was started at 0.0 minutes and added over 45 minutes. One hundred minutes after Feed I was completed (over 99% of the monomers had reacted), Feed II [benzyl methacrylate BZMA, 493.10 gm (2.80 M)] was started and added over 30 minutes.

After stirring 1 hour, 104 gm of dry methanol were added to the above solution and distillation begun, 697.0 g of 2-pyrrolidone replacing the solvents. This made a BZMA//MAA 13//10 diblock polymer, with a final solids of 50%.

Polymer Preparation 5

This shows the preparation of an cationic polymer, BZMA//DMAEMA/ETEGMA 10//20/3 diblock polymer:

A 12-liter flask was equipped with a mechanical stirrer, thermometer, N2 inlet, drying tube outlet, and addition funnels. Tetrahydrofuran THF, 4002 gm, and p-xylene, 7.7 gm, were charged to the flask. The catalyst, tetrabutyl ammonium m-chlorobenzoate, 2.0 ml of a 1.0M solution in acetonitrile, was then added initiator, 1-methoxy-1-trimethylsiloxy-2-methyl propene, 155.1 gm (0.891M) was injected. Feed I [2-dimethyaminoethyl methacrylate DMAEMA, 2801 gm (17.8M)] was started at 0.0 minutes and added over 45 minutes. One hundred minutes after Feed I was completed (over 99% of the monomers had reacted), Feed II [a mixture of benzyl methacrylate BZMA, 1568 gm (8.91M) and 2-(ethyoxytri-ethyleneglycol) methacrylate ETEGMA, 658 gm (2.67M)] was started and added over 30 minutes.

At 400 minutes, 310 gm of dry methanol were added to the above solution and distillation begun. A total of 4725 gm of solvent was removed. This made a BZMA//DMAEMA/ETEGMA diblock polymer, with a final solids of 48.5%.

Dispersion Preparation 1

This shows the preparation of an anionic carboxylic-acid containing black dispersion, ETEGMA//BZMA//MAA-KOH 4//15//12.

A black pigment dispersion was prepared using the following procedure:

| Ingredient | Amount (Gm) |
| --- | --- |
| FW18, Carbon black pigment (Degussa Corp. Allendale, NJ | 60.0 |
| Polymer obtained from Preparation 1 (10% solution) | 300.0 |
| Deionized water | 240.0 |
| Total | 600.0 |

The above mentioned components were premixed in a plastic beaker by mechanical stirring until no lumps or dry clumps were visible. The mixture was dispersed in a microfluidizer (Microfluidics Corp., Waltham, Mass.) by passing it through the interaction chamber 5 times under a liquid pressure of about 8,000 psi. The resulting pigment dispersion had a 10% pigment concentration. The dispersion was filtered through a 1 micron high efficiency filter bag (3M Filtration Products, St. Paul, Minn. 55144-1000).

Dispersion Preparation 2

This shows the preparation of an anionic sulfonic-acid containing cyan dispersion.

A cyan pigment dispersion was prepared using the following procedure:

| Ingredient | Amount (Gm) |
| --- | --- |
| Endurophthal® BT-617D (Cookson Pigments Newark, NJ) | 150.0 |
| Polymer obtained form preparation 3 (33.5% solids) | 298.5 |
| Deionized water | 1051.5 |
| Total | 1500.0 |

The above mentioned components were premixed in a plastic beaker by mechanical stirring until no lumps or dry clumps were visible. The mixture was dispersed in a ball mill with ceramic media for 48 hours. The resulting pigment dispersion had a 10% pigment concentration.

Dispersion Preparation 3

This shows the preparation of an anionic sulfonic-acid containing magenta dispersion.

A magenta pigment dispersion was prepared using the following procedure:

| Ingredient | Amount (Gm) |
| --- | --- |
| Magenta 122, FC4097, (Sun Chemical Corp, Cincinnati, OH; 51% solids) | 294.1 |
| Polymer obtained from preparation 3 (33.5% solids) | 298.5 |
| Deionized water | 907.4 |
| Total | 1500.0 |

The above mentioned components were premixed in a plastic beaker by mechanical stirring until no lumps or dry clumps were visible. The mixture was dispersed in a ball mill with ceramic media for 48 hours. The resulting pigment dispersion had a 10% pigment concentration.

Dispersion Preparation 4

This shown the preparation of an anionic carboxylic-acid containing cyan dispersion.

A cyan pigment dispersion was prepared using the following procedure:

The following ingredients were mixed:

| Ingredient | Amount (Gm) |
| --- | --- |
| Endurophthal® BT-617D (Cookson Pigments Newark, NJ) | 150.0 |
| Polymer obtained from preparation 4 (50% solids) | 200.0 |
| Total | 300.0 |

This mixture was then charged to a 2 roll mill and processed for 60 minutes. This made a pigment dispersion that contained 60% pigment and 40% polymer. It had a P/D=1.5/1. This 2 roll mill chip was then dissolved using potassium hydroxide in water as the neutralizing agent. Additional water was added to make an aqueous pigment concentrate at 10% pigment solids.

Dispersion Preparation 5

This shows the preparation of a cationic amine-containing magenta dispersion.

A magenta pigment dispersion was prepared using the following procedure:

The following ingredients were mixed:

| Ingredient | Amount (Gm) |
| --- | --- |
| R-122 presscake, 50% solids (Sun Chemical Corp. Cincinnati, OH) | 300.0 |
| Polymer obtained from Preparation 5 (48.5% solids) | 309.3 |
| Total | 609.3 |

This mixture was then charged to a 2 roll mill and processed for 60 minutes. This made a pigment dispersion that contained 60% pigment and 40% polymer. It had a P/D=1.5/1. This 2 roll mill chip was then dissolved using phosphoric acid in water as the neutralizing agent. Additional water was added to make an aqueous pigment concentrate at 10% pigment solids.

Dispersion Preparation 6

This shows the preparation of an anionic carboxylic-acid containing yellow dispersion.

A yellow pigment dispersion was prepared using the following procedure:

The following ingredients were mixed:

| Ingredient | Amount (Gm) |
| --- | --- |
| Irgalite® LBG Yellow (CIBA Pigments Newark, DE) | 150.0 |
| Polymer obtained from preparation 4 (50% solids) | 200.0 |
| Total | 350.0 |

This mixture was then charged to a 2 roll mill and processed for 60 minutes. This made a pigment dispersion that contained 60% pigment and 40% polymer. It had a P/D=1.5/1. This 2 roll mill chip was then dissolved using potassium hydroxide in water as the neutralizing agent. Additional water was added to make an aqueous pigment concentrate at 10% pigment solids.

Control 1

An anionic, carboxylic acid containing black ink with the following formula was prepared by the following procedure:

An ink containing 3.75% pigment and 1.875% polymer dispersant was prepared by stirring together 35 grams of Dispersion Preparation 1 with appropriate quantities of Liponics® EG-1, obtained from Lipo Chemicals, Inc. Patterson, N.J., 2-Pyrrolidone, and Nuosept® 95, Huls America, Inc., Piscataway, N.J., and deionized water to make an ink with final concentrations of 8% Liponics® EG-1, 10% 2-Pyrrolidone, and 0.3% Nuosept® 95.

An anionic, carboxylic-acid containing cyan ink with the following formula was prepared by the following procedure:

An ink containing 2.5% pigment and 1.67% polymer dispersant was prepared by stirring together appropriate quantities of Dispersion 4 and Tetraethylene glycol, Liponics®EG-1, 2-Pyrrolidone, Nuosept® 95, and deionized water to make an ink with final concentrations 4% tetraethylene glycol, 5% Liponics® EG-1, 6% 2-Pyrrolidone, and 0.5% Nuosept® 95.

The black and cyan inks were printed in adjacent areas onto Champion Data Copy paper using a Hewlett Packard 1200C printer, Hewlett-Packard Co., Palo Alto, Calif., with the heater turned off. Bleed was rated on a scale of A–F, with A being the best and F being the worst.

This print had a bleed rating of F.

Control 2

An anionic, carboxylic acid containing black ink was prepared as described in Control 1.

An anionic, carboxylic-acid containing yellow ink with the following formula was prepared by the following procedure:

An ink containing 3.0% pigment and 1.5% polymer dispersant was prepared by stirring together appropriate quantities of Dispersion 6 and 2-Pyrrolidone, Liponics® EG-1, and deionized water to make an ink with final concentrations of 5% Liponics® EG-1, and 9% 2-Pyrrolidone.

The inks were printed as described in Control 1 and the amount of bleed observed was rated as described in Control 1.

This print had a bleed rating of F.

Control 3

An anionic, carboxylic-acid containing cyan ink was prepared as described in Control 1.

An anionic, carboxylic-acid containing yellow ink was prepared as described in Control 2.

The inks were printed as described in Control 1 and the amount of bleed observed was rated as described in Control 1.

This print had a bleed rating of D.

Example 1

An anionic, carboxylic-acid containing, black ink-jet ink was prepared as described in Control 1

An anionic, sulfonic-acid containing cyan ink-jet ink with the following formula was prepared:

An ink containing 3.0% pigment and 1.5% polymer dispersant was prepared by stirring together appropriate quantities of Dispersion 2 and 2-Pyrrolidone, Liponics® EG-1, citric acid, and deionized water to make an ink with final concentrations of 5% Liponics® EG-1, 9% 2-Pyrrolidone and 3% citric acid.

The inks were printed as described in Control 1 and the amount of bleed observed was rated as described in Control 1.

This print had a bleed rating of A.

Example 2

An anionic, carboxylic-acid containing, black ink-jet ink was prepared as described in Control 1.

An anionic, sulfonic-acid containing magenta ink-jet ink was prepared using the following procedure:

An ink containing 3.0% pigment and 1.5% polymer dispersant was prepared by stirring together appropriate quantities of Dispersion 6 and 2-Pyrrolidone, Liponics® EG-1, citric acid and deionized water to make an ink with final concentrations of 5% Liponics® EG-1, 9% 2-Pyrrolidone, and 3% citric acid.

The inks were printed as described in Control 1 and the amount of bleed observed was rated as described in Control 1.

This print had a bleed rating of A.

Example 3

An anionic, sulfonic-acid containing cyan ink-jet ink was prepared as described in Example 1.

An anionic, carboxylic-acid containing, yellow ink-jet ink was prepared as described in Control 2.

The inks were printed as described in Control 1 and the amount of bleed observed was rated as described in Control 1.

This print had a bleed rating of A.

Example 4

An anionic, sulfonic acid containing cyan ink-jet ink was prepared as described in Example 1.

A cationic neutralized amine containing, magenta ink jet ink was prepared using the following procedure:

An ink containing 3.0% pigment and 1.5% polymer dispersant was prepared by stirring together appropriate quantities of Dispersion 5 and 2-Pyrrolidone, Liponics® EG-1, and deionized water to make an ink with final concentrations of 5% Liponics® EG-1, and 9% 2-Pyrrolidone.

The inks were printed as described in Control 1 and the amount of bleed observed was rated as described in Control 1.

This print had a bleed rating of B.

What is claimed is:

1. A set of printing liquids particularly adapted to alleviate bleed from one liquid into the other during printing comprising:
    (a) a first pigmented printing liquid comprising:
        (i) an aqueous carrier medium,
        (ii) a pigment, and
        (iii) a polymeric dispersant having at least one group selected from the group consisting of a neutralized carboxylic acid group, a neutralized amine group and a quaternized amine group; and
    (b) a second pigmented printing liquid comprising:
        (i) an aqueous carrier medium,
        (ii) a pigment,
        (iii) a polymeric dispersant having at least one sulfonate or phosphonate group, and
        (iv) a carboxylic acid additive having a C(O)OH moiety and having a pKa of up to 3.5.

2. The set of claim 1 wherein both the first and second printing liquids are anionic.

3. The set of claim 1 wherein the first printing liquid is cationic and the second printing liquid is anionic.

4. The set of claim 1 wherein said dispersants are selected from the group consisting of AB, BAB, and ABC block copolymers, and $A_x(BA)_yB_z$ graft copolymers wherein x is 0 to 10,000, y is 2 to 10,000, and z is 0 to 10,000.

5. The set of claim 1 wherein the carboxylic acid additive is present in the amount of approximately 0.2 to 30%, based on the total weight of the second pigmented printing liquid.

6. The set of claim 5 wherein the carboxylic acid additive is selected from the group consisting of oxalic acid, citric acid, glycolic acid, bromoacetic acid, chloroacetic acid, chloropropionic acid, maleic acid, malonic acid, phthalic acid and tartaric acid.

7. An ink set particularly adapted to alleviate bleed from one ink to the other during ink-jet printing, said ink set comprising:
    (a) a first pigmented ink comprising:
        (i) an aqueous carrier medium,
        (ii) a pigment, and
        (iii) a polymeric dispersant having at least one group consisting of a neutralized carboxylic acid group, a neutralized amine group, and a quaternized amine group; and
    (b) a second pigmented ink comprising:
        (i) an aqueous carrier medium,
        (ii) a pigment,
        (iii) a polymeric dispersant having at least one sulfonate or phosphonate group, and
        (iv) a carboxylic acid additive having a C(O)OH moiety and having a pKa of up to 3.5.

8. The set of claim 7 wherein said dispersants are selected from the group consisting of AB, BAB, and ABC block copolymers and $A_x(BA)_yB_z$ graft copolymers wherein x is 0 to 10,000, y is 2 to 10,000, and z is 0 to 10,000.

9. The ink set of claim 8 wherein the carboxylic acid additive present in said second ink is present in the amount of approximately 0.2 to 30%, based on the total weight of said ink.

10. The ink set of claim 9 wherein said carboxylic acid additive has a pKa up to approximately 2.5.

11. The ink set of claim 9 wherein said carboxylic acid additive is selected from the group consisting of oxalic acid, citric acid, glycolic acid, bromoacetic acid, chloroacetic acid, chloropropionic acid, maleic acid, malonic acid, phthalic acid and tartaric acid.

12. The ink set of claim 8 wherein said pigment in each ink has a particle size of 0.005 to 15 microns and is present in the amount of approximately 0.1 to 15% by weight, based on the total weight of the ink.

13. The ink set of claim 7 wherein the polymeric dispersant in the first ink is quaternized with at least one compound selected from the group consisting of benzyl chloride, methyl iodide, methyl sulfate and dimethyl sulfate.

14. The ink set of claim 7 wherein the polymeric dispersant in the first ink is neutralized with dimethylethanolamine, sodium hyroxide or potassium hydroxide.

15. The ink set of claim 7 wherein the polymer in the second ink is neutralized with at least one compound selected from the group consisting of organic bases; alcohol amines; pyridine; ammonium hydroxide; tetraalkylammonium salts and alkali metals.

16. A process for creating a multicolor printed element having reduced color bleed comprising:
  (a) providing a first pigmented printing liquid comprising:
    (i) an aqueous carrier medium,
    (ii) a pigment, and
    (iii) a polymeric dispersant containing at least one group selected from the group consisting of a neutralized carboxylic acid group, a neutralized amine group, and a quaternized amine group;
  (b) providing a second pigmented printing liquid comprising:
    (i) an aqueous carrier medium,
    (ii) a pigment,
    (iii) a polymeric dispersant having at least one sulfonate or phosphonate group, and
    (iv) a carboxylic acid additive having a C(O)OH moiety and having a pKa of up to 3.5; and
  (c) applying said first and second printing liquids to a substrate in contact with each other.

17. The process of claim 16 wherein said printing liquids are inks and are applied to said substrate by an ink-jet printer.

18. The process of claim 17 wherein said inks are applied in abutting relationship to each other.

19. The process of claim 17 wherein said inks are applied in overlay relationship to each other.

20. The process of claim 17 wherein said substrate is paper.

21. The process of claim 17 wherein said dispersants are selected from the group consisting of AB, BAB, and ABC block copolymers, and $A_x(BA)_yB_z$ graft copolymers wherein x is 0 to 10,000, y is 2 to 10,000, and z is 0 to 10,000.

22. The process of claim 21 wherein the carboxylic acid present in said second ink in the amount of approximately 0.2 to 30%, based on the total weight of said ink.

23. The process of claim 22 wherein said carboxylic acid additive has a pKa up to approximately 2.5.

24. The process of claim 22 wherein said carboxylic acid additive is selected from the group consisting of oxalic acid, citric acid, glycolic acid, bromoacetic acid, chloroacetic acid, chloropropionic acid, maleic acid, malonic acid, phthalic acid and tartaric acid.

25. The process of claim 21 wherein said pigment in each ink has a particle size of 0.005 to 15 microns and is present in the amount of approximately 0.1 to 15% by weight, based on the total weight of the ink.

26. The process of claim 17 wherein the polymeric dispersant in the first ink is quaternized with at least one compound selected from the group consisting of benzyl chloride, methyl iodide, methyl sulfate and dimethyl sulfate.

27. The process of claim 17 wherein the polymeric dispersant in the first ink is neutralized with dimethylethanolamine, sodium hyroxide or potassium hydroxide.

28. The process of claim 17 wherein the polymer in the second ink is neutralized with at least one compound selected from the group consisting of organic bases; alcohol amines; pyridine; ammonium hydroxide; tetraalkylammonium salts and alkali metals.

29. A set of printing liquids particularly adapted to alleviate bleed from one liquid into the other during printing comprising:
  (a) a cationic pigmented printing liquid comprising:
    (i) an aqueous carrier medium,
    (ii) a pigment, and
    (iii) a polymeric dispersant having at least one group selected from the group consisting of a neutralized carboxylic acid group, a neutralized amine group and a quaternized amine group; and
  (b) an anionic pigmented printing liquid comprising:
    (i) an aqueous carrier medium,
    (ii) a pigment, and
    (iii) a polymeric dispersant having at least one sulfonate or phosphonate group, and
    (iv) a carboxylic acid additive having a pKa of up to 3.5.

* * * * *